(12) United States Patent
Arrazola De Oñate

(10) Patent No.: US 10,105,628 B2
(45) Date of Patent: Oct. 23, 2018

(54) FILTER ELEMENT

(71) Applicant: DACO S.R.O., Zilina (SK)

(72) Inventor: Dominik Jan H. Arrazola De Oñate, Budapest (HU)

(73) Assignee: DACO S.R.O., Zilina (SK)

( * ) Notice: Subject to any disclaimer, the term of this patent is extended or adjusted under 35 U.S.C. 154(b) by 0 days.

(21) Appl. No.: 15/121,575

(22) PCT Filed: Feb. 26, 2015

(86) PCT No.: PCT/IB2015/000245
§ 371 (c)(1),
(2) Date: Aug. 25, 2016

(87) PCT Pub. No.: WO2015/128726
PCT Pub. Date: Sep. 3, 2015

(65) Prior Publication Data
US 2016/0354719 A1   Dec. 8, 2016

(30) Foreign Application Priority Data

Feb. 28, 2014   (BE) .................... 2014/0138

(51) Int. Cl.
*B01D 46/00* (2006.01)
*B01D 46/02* (2006.01)

(52) U.S. Cl.
CPC ....... *B01D 46/023* (2013.01); *B01D 46/0002* (2013.01); *B01D 46/002* (2013.01); *B01D 46/0005* (2013.01); *B01D 2275/201* (2013.01); *B01D 2275/208* (2013.01); *B01D 2277/10* (2013.01); *B01D 2279/35* (2013.01)

(58) Field of Classification Search
CPC .. B01D 46/00; B01D 46/0005; B01D 46/002; B01D 46/023; B01D 2275/208; B01D 2277/10; B01D 2279/35
USPC ................................... 55/361–382
See application file for complete search history.

(56) References Cited

U.S. PATENT DOCUMENTS

| | | | |
|---|---|---|---|
| 1,821,202 A | | 9/1931 | Birkholz |
| 2,612,236 A | * | 9/1952 | Vedder ............... B01D 46/0005 55/304 |
| 6,099,612 A | * | 8/2000 | Bartos ................ B01D 46/0005 55/481 |

(Continued)

FOREIGN PATENT DOCUMENTS

| | | | |
|---|---|---|---|
| EP | 2537571 A1 | 12/2012 | |
| WO | WO 2013185878 A1 * | 12/2013 | ......... B01D 46/0045 |

OTHER PUBLICATIONS

Belgium Search Report for corresponding Belgium Application No. 2014/0138, dated Jan. 13, 2015.

(Continued)

*Primary Examiner* — T. Bennett McKenzie
(74) *Attorney, Agent, or Firm* — Workman Nydegger

(57) ABSTRACT

A filter element for filtering impurities from air, whereby the filter element comprises one or more filters, whereby each filter is composed of a filter frame that is connected to a filter bag, characterized in that the filter frame and the inflow opening of the inlet piece have an aerodynamic design and that the filter bag is essentially cylindrical of which the one end is open and fastened to the inflow opening and the other end is closed.

17 Claims, 4 Drawing Sheets

(56) References Cited

U.S. PATENT DOCUMENTS

2002/0073849 A1\* 6/2002 Buettner ............ B01D 39/1623
  95/280
2015/0174518 A1\* 6/2015 Caesar ............... B01D 46/0045
  55/341.2

OTHER PUBLICATIONS

International Preliminary Report on Patentability for corresponding International PCT Application No. PCT/IB2015/000245, dated May 13, 2016.
International Search Report for corresponding International PCT Application No. PCT/IB2015/000245, dated Jun. 25, 2015.

\* cited by examiner

|  | I | II |
|---|---|---|
| $P_{in}(Pa)$ | 101 392 | 101 410 |
| $P_{out}(Pa)$ | 101 328 | 101 329 |
| $\Delta P(Pa)$ | 64 | 81 |

FILTER ELEMENT

BACKGROUND

The present invention relates to a filter element for filtering impurities from air.

More specifically, the invention concerns a filter element that comprises one or more filters whereby each filter is composed of an inlet piece that is connected to a filter bag whereby this filter element is intended for removing dust, dirt and other impurities in the solid phase present in the air.

In particular the invention is for ventilation units that are used in buildings and similar and is specifically focused on static filtration.

Such conventional filter elements of the bag filter type are already known and are used for example in filter devices of climate controllers, air purification systems, compressors, gas turbines, in order to remove impurities from the air to ensure that the impurities cannot hinder the good operation of the equipment or to ensure that the air remains clean.

Using the filter device in which the filter element is affixed all kinds of impurities can be removed from the air to be filtered, because the filter element is provided with a filter through which air can flow but which is impermeable to impurities.

To this end the filter is made from a suitable material according to the application and type of impurities, for example.

It is known that the design of filter elements has not changed for a long time.

With such traditional filter elements the form is not optimum for realising a good flow of air.

A square or rectangular cross-section of the inlet opening of the filter bag is often used, but this form causes high flow resistance for the air and a large pressure drop in the air around the device.

This has the disadvantage that more energy is needed to guide and filter the same volume of air through the filter element.

The form of the filter bag is not aerodynamic either, such that the air resistance over the entire surface of the filter is relatively high and is not constant either.

This will be detrimental to the efficient operation of the filter element, as not all of the surface of the filter bag is used to an equal extent.

As a result dust, dirt and impurities can accumulate locally more quickly and the filter bag can become saturated faster.

Other types of filter elements are also known that are not a bag filter, but consist of folded filter media such as described in EP 2.537.571 for example. These filter elements are a completely different type and are used in filter devices for removing dust, whereby they can be cleaned by means of 'pulse cleaning', for example.

According to the applicant, with such filter elements the form of the filter itself is far from optimum and is not adapted to obtain a good flow of air.

The flow through the filter element is from the outside of the filter element to the inside. In other words: this is the opposite of the conventional flow through a bag filter.

In the opinion of the applicant, filter elements as described in U.S. Pat. No. 1,821,202 are not of optimum form. Furthermore, here it concerns the replaceability of the filter medium that is fastened in a metal basket. The filter capsules are fastened in a fixed wall, this is in contrast to bag filters, where the bags are fastened in a frame.

SUMMARY

The purpose of the present invention is to provide a solution to at least one of the aforementioned and other disadvantages.

To this end the invention concerns a static filter element with an aerodynamic design.

The object of the present invention is a filter element for filtering impurities from air, whereby the filter element comprises one or more filters, whereby each filter is composed of a filter frame that is connected to one or more filter bags, whereby the filter frame and one or more inflow openings of the filter frame have an aerodynamic design and the filter bag is essentially cylindrical of which the one end is open and fastened to the inflow opening and the other end is closed.

Cylindrical here means a form similar to a cylinder, whereby the diameter of the filter bag may or may not change in the longitudinal direction of the filter bag, whereby the diameter is preferably at least three times smaller than the length of the filter bag.

An advantage is that due to the aerodynamic design the air flow resistance through the filter element is kept to a minimum.

Moreover, the pressure drop across the filter element will be kept to a minimum, which provides the advantage that less energy is needed to let air flow through the device.

'Essentially cylindrical' here means that the form of the filter bag can deviate from a perfect cylinder, but that the general form is still elongated whereby the cross-sections of the filter bag parallel to the inflow opening are identical.

For example the filter bag can also be skittle-shaped.

Skittle-shaped here means a form similar to a skittle or 'pin' in of a game of bowls.

The filter bag can also have the form of a mathematical cone or a form derived therefrom.

Preferably the diameter of the filter bag changes in the longitudinal direction of the filter bag, whereby from the inflow opening the diameter is constant or approximately constant over a certain distance of the length of the filter bag, after which the diameter then gradually decreases over a certain distance, after which the diameter gradually increases again and whereby the closed end has a spherical or practically spherical form.

This has the advantage that such a filter bag, in combination with the aerodynamic design of the filter frame, will ensure that the air resistance over the entire surface is equal and as low as possible, such that air flows through the entire surface of the filter bag evenly and uniformly. Consequently the impurities will be distributed evenly over the surface of the filter bag.

BRIEF DESCRIPTION OF THE DRAWINGS

With the intention of better showing the characteristics of the invention, a few preferred embodiments of a filter element according to the invention are described hereinafter by way of an example, without any limiting nature, with reference to the accompanying drawings, wherein.

DETAILED DESCRIPTION OF VARIOUS EMBODIMENTS

Figure 1:
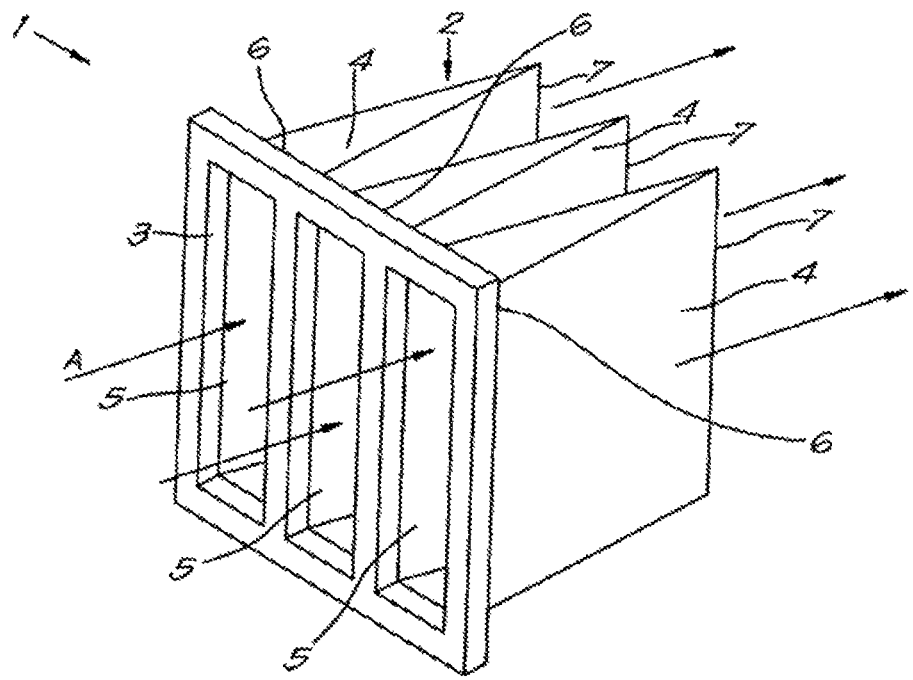
FIG. 1 schematically shows a perspective view of a conventional filter element.

The traditional filter element 1 shown in FIG. 1 essentially comprises a number of filter bags 4, in this case three. The filter bags 4 together with a filter frame 3 form a filter 2.

The filter frame 3 has a rectangular design with rectangular inflow openings 5 for air.

A bag-shaped filter bag 4 is affixed at each inflow opening 5, which has an open rectangular cross-section on one side 6 and on the other side 7 it tapers in the width and is closed.

Such traditional filter elements 1 are used in filter devices for air purification systems, for example, where the air to be purified is guided through the filter device via the filter element 1 in the direction of the arrows A in order to filter dust, dirt or impurities from the air.

Due to the rectangular shape of the inflow opening 5 and the form of the filter bag 4, the air to be filtered, which flows through the filter bag 4 via the inflow opening 5, experiences a lot of resistance.

As a result more energy will be required to drive the air through the filter element 1.

Moreover, the combination of the design, the filter frame 3 and the filter bag 4 will ensure that the air resistance over the surface of the filter bag 4 is not constant such that the impurities are not evenly distributed over the surface of the filter bag 4, which leads to the filter element 1 not being used efficiently.

Figure 2:
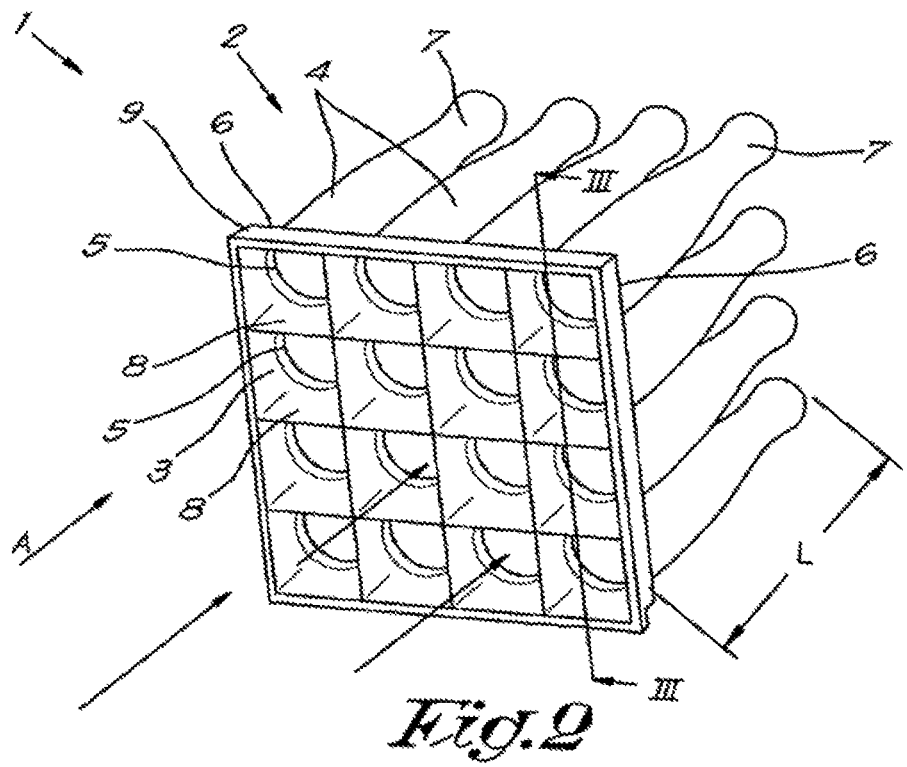
FIG. 2 schematically shows a perspective view of a filter element according to the invention.
Figure 3:
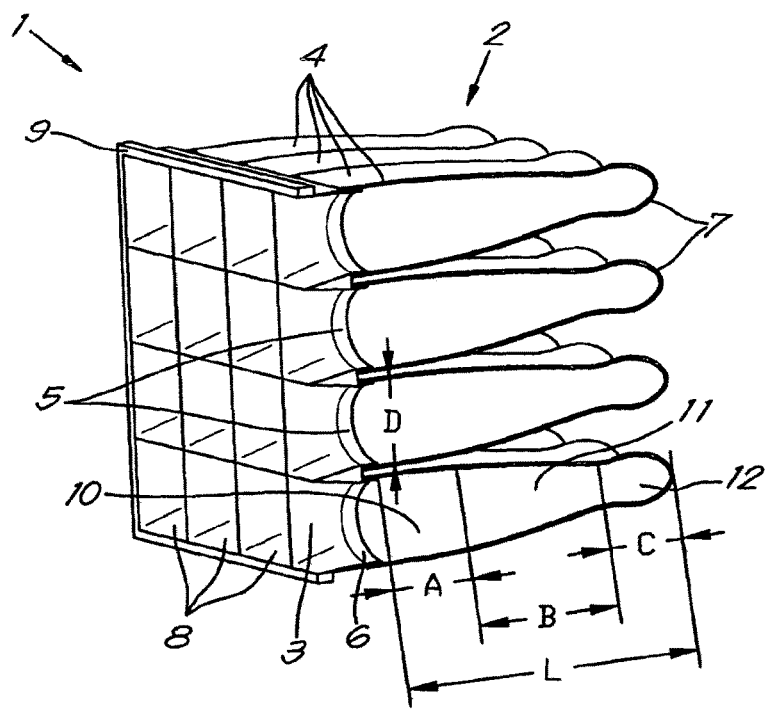
FIG. 3 shows a cross-section according to the line in FIG. 2.

The filter element 1 according to the invention shown in FIGS. 2 and 3 comprises a number of filter bags, in this case sixteen. The filter bags 4 together with a filter frame 3 form a filter 2.

It is not excluded that the filter frame 3 is composed of different parts, if this is necessary for the production process for example.

According to the invention the filter frame 3 has an aerodynamic design, which means that the sidewalls 8 of the filter frame 3 are bent according to a well defined curve or bend.

This curve can be determined on the basis of simulations and calculations using a simulation program based on fluid mechanics, more specifically fluid dynamics.

On the basis of these calculations the design can be determined for which the air flow resistance is as low as possible.

In this case the inflow opening 5 has a circular cross-section. It is also possible that the inflow opening 5 has an oval or polygonal cross-section. For example an octagonal or decagonal cross-section is also possible. In other words: the shape of the inflow opening 5 is circular or one of its derived forms.

By means of the aforementioned calculations, which inflow opening 5 causes the least resistance to the air flow can be determined, taking account of the flow rate or the material from which the filter bag 4 is made.

Figure 4:
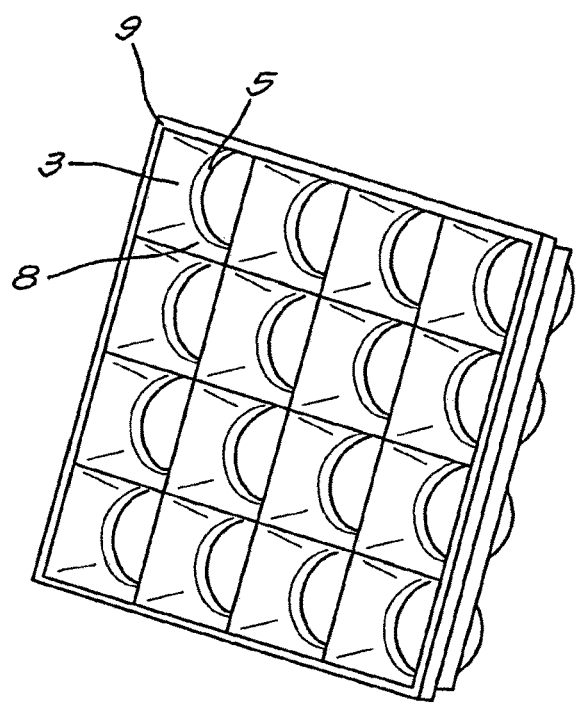
FIG. 4 schematically shows a perspective view of the frame of the filter element of FIG. 2.

As shown in FIG. 4, in this case the inflow openings 5 of the filter frame 3 are arranged in a 4×4 grid. In this case, but not necessarily, a casing 9 is affixed around the filter frame 3 for fastening in a filter device.

It is also possible that each filter frame 3 is provided with only one inflow opening 5, whereby a number of filter frames 3 are arranged in a grid, whereby the filter frames 3 are connected together for example by suitable fastening means such as clamps or similar, if need be in combination with seals, whereby the filter frames 3 are affixed in a casing 9 if need be that fits around the grid of inlet pieces 3. It is possible that this casing 9 is omitted.

It is also possible to arrange a number of filter frames 3, as shown in FIG. 4, in a grid so that a composite filter element 1 is obtained.

Such a construction of the filter element 1 will enable a suitable number of filters 2 to be used in a suitable configuration according to the situation or application for which the filter element is to be used. It will for example be easy to adapt to the filter device in which the filter element 1 is to be used.

Moreover, in this case each filter frame 3 can be detached separately from the casing 9 and the other filter frames 3.

As a result complete filters 2 can be replaced or detached if necessary.

The filter bags 4 are affixed with a close fit to the filter frame 3 in line with the inflow openings 5 as it were.

In the example shown, each filter bag 4 is essentially skittle-shaped and is fastened by its open end 6 to the inflow opening 5. The other end 7 of the filter bag 4 is closed.

Skittle-shaped here means a form similar to a skittle or 'pin' in a game of bowls.

In this case, the end 7 is rounded, which favours the aerodynamics.

As can be seen in the drawings, the filter bag 4 has a length greater than the diameter D. Preferably the ratio of the maximum diameter D of the filter bag 4 to the length of the filter bag 4 is equal to one to at least three. For example one to four.

The cross-section of the filter bag 4 in a plane parallel to the inflow opening 5 is circular in this case, like the shape of the inflow opening 5. This cross-section can also be oval or polygonal. At different locations along the longitudinal direction of the filter bag 4, the cross-sections have different dimensions but they will all have the same shape.

In this case the design of the filter bag 4 is determined on the basis of the aforementioned calculations, so that the air resistance over the entire surface of the filter bag 4 is constant, so that the impurities are captured evenly over the surface of the filter bag 4.

More specifically, the diameter D of the filter bag 4 changes in the longitudinal direction of the filter bag. This means that the cross-section of the filter bag 4 is not constant in the longitudinal direction.

In this case the filter bag 4 is divided into three parts 10, 11, 12 as it were:

a first part 10 runs from the inflow opening 5 and has a length A of approximately 25% of the total length L of the filter bag 4;

the next, second part 11 covers a length B of approximately 60% of the total length L of the filter bag 4;

the third part 12 is the remaining part of the filter bag 4 including the closed end 7, which has a length C of approximately 15% of the total length L of the filter bag 4.

These three parts are indicated for one of the filter bags 4 in FIG. 3.

In this case the closed end 7 has a spherical form.

In this case the diameter D of the filter bag in the first part 10 is constant.

In the second part 11 the diameter D gradually decreases, whereby in the third part 12 the diameter D increases again up to the closed end 7 with a spherical form.

Simulations and calculations using a simulation program based on fluid dynamics show that the ratio of the diameter D of the filter bag 4 at the inflow opening 5 to the diameter D at the end of the first part 10 is preferably 1.

The ratio of the smallest diameter D of the filter bag 4 to the diameter D of the filter bag 4 at the inflow opening 5 is preferably 0.57.

The ratio of the diameter D of the spherical end 7 to the diameter D of the filter bag 4 at the inflow opening 5 is preferably equal to 0.71.

The above-mentioned ratios and dimensions of the three parts 10, 11 and 12 determine an optimised aerodynamic form for the filter bag 4, for a set flow rate, filter material and application.

The precise dimensions of the filter frame 3 and the filter bag 4 will depend on the flow of the air to be filtered, the impurities present or the material from which the filter bag 4 is made. However, the form of the filter bag will always present a certain skittle shape, whereby from the inflow opening the diameter is constant or approximately constant over a certain distance of the length of the filter bag, after which the diameter then gradually decreases over a certain distance, after which the diameter gradually increases again and whereby the closed end has a spherical or practically spherical form.

In this case the filter bag 4 is made of a rigid material, for example a metal gauze, such that the form of the filter bag 4 is always preserved, even when no air is flowing through the filter element 1.

What material is used is, as is known, determined by the impurities to be removed, more specifically the material must be impermeable to the impurities while air must be able to flow through it. It is consequently not excluded that another type of material is used, such as for example paper, plastic, woven fabric, non-woven fabric or another material with a certain porosity if the application so requires.

The operation of the filter element 1 of FIGS. 2 and 3 is very simple and as follows.

A filter element 1 according to the invention can be used to filter air in order to remove dust, dirt and other impurities in the solid phase from the air.

When the filter element 1 is in use, air will flow through it whereby the air will flow through the filter frame 3 via the inflow openings 5 to the filter bags 4 according to the arrows A.

Due to the aerodynamic design of the filter frame 3 and the filter bags 4, the air flow resistance through the filter element 1 will be minimal, such that less energy is required to drive the same quantity of air through the filter element 1.

Moreover, the resistance of the air will be the same over the entire surface of the filter bag 4, and minimal, such that the air will flow evenly over the entire surface and impurities will be caught evenly.

Figures 5, 6:
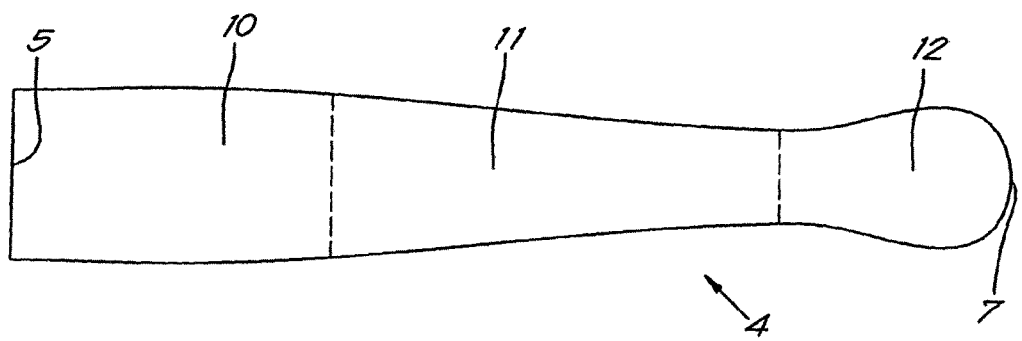
FIG. 5 shows a table of results from experiments done with the filter element according to the invention.
FIG. 6 schematically shows an alternative form of a filter bag 4 according to the invention.

FIG. 5 shows the results of experiments in which the pressure drop across the filter element 1 was measured.

Column I shows the measured values of the pressure in the air that flows through a filter element 1, whereby the pressure $P_{in}$ on the inlet side and the pressure $P_{out}$ on the outlet side of the filter element 1, as shown in FIGS. 2 and 3, were measured, whereby the filter bags 4 have the optimised form described above.

Column II shows similar measurements, but for a filter element 1 for which the filter bags 4 do not have the optimised form described above, but whereby the filter bags 4 have a constant diameter D over their entire length.

As can be derived from FIG. 5, the pressure drop $\Delta P = P_{in} - P_{out}$ across the filter element 1 is smaller when the form of the filter bags 4 is optimised. In other words, the optimised form, calculated using fluid dynamics, will ensure that the air flowing through the filter 2 experiences less resistance.

When the air flows through the filter bags 4, the impurities present in the air will be held back by the filter bags 4 as they are not permeable to the impurities.

The air that has flowed through the filter bags 4 will consequently be free of impurities.

When a certain quantity of dirt, dust and other impurities have accumulated in the filter bags 4, the good operation of the filter element 1 can decrease because the filter bags 4 are partly filled with impurities.

By detaching a filter frame 3 from the filter element 1, the fouled filters 2 can be taken out of the filter element 1 and can be cleaned and fastened in the filter element 1 again afterwards.

It is also possible, but not necessary, that use is made of disposable filters 2, whereby the fouled filters 2 are replaced by new filters.

Due to the aerodynamic design of the filter frame 3 and the filter bags 4, the entire surface of the filter bag 4 is used, such that a local accumulation of impurities is not possible and there is thus no accompanying clogging or blockage of the filter bag 4. Consequently the filter bag 4 can be used for longer before it must be replaced.

It is possible that in the first part 10 the diameter D is not constant, but that the filter bag 4 has a somewhat larger diameter D at a certain distance from the inflow opening 5. An example of such a form of the filter bag 4 is shown in FIG. 6.

Figure 7:
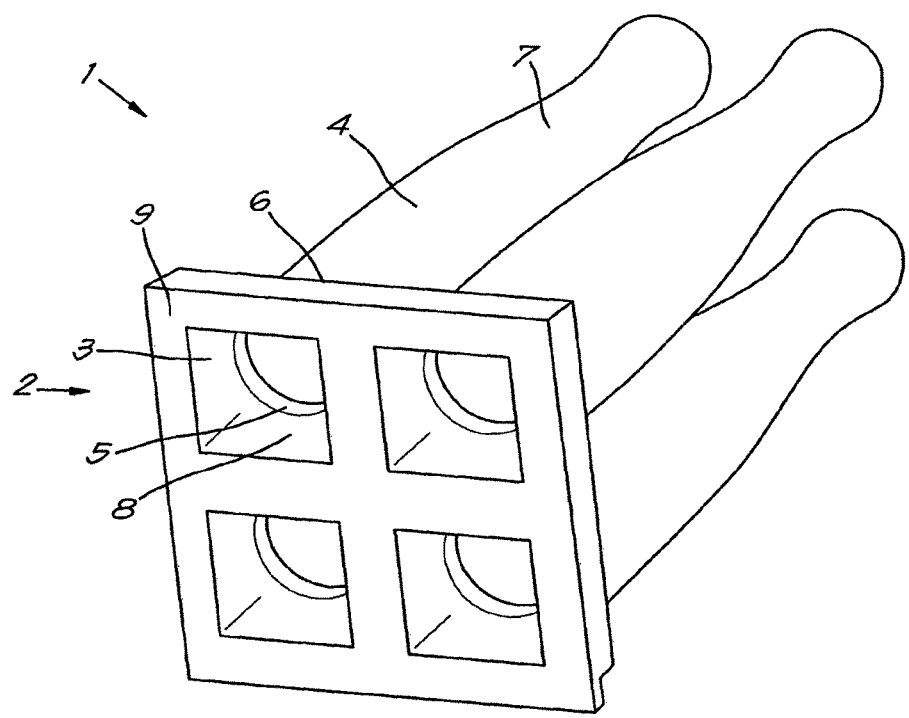
FIG. 7 schematically shows a perspective view of an alternative embodiment of a filter element according to the invention.

FIG. 7 shows an alternative embodiment of a filter element 1 according to the invention.

In this example a casing 9 is provided in which four filter frames 3 are affixed in this case. In this case the filter frames 3 together with the casing 9 form one unit. This has the advantage that there is no possibility for air to flow through the filter element 1 between two filter frames 3.

The unit can be made of plastic by injection moulding for example. In the previous embodiment shown, the filter frames 3 are also preferably made of plastic.

It is clear that in this case the filter frames 3 are not detachable from one another and cannot be separated from the casing 9.

The design of the filter frames 3 is the same as in the embodiment previously described.

Each filter frame 3 is provided with a filter bag 4 that has a similar form to the filter bag 4 of the previous embodiment.

According to a particular characteristic of the invention, each filter bag 4 is separately detachable from the filter frame 3 concerned.

This has the advantage that the filter element 1 can also be used in combination with disposable filter bags.

It is clear that it is also possible that the filter bag 4 forms an inextricable unit with the filter frame 3 concerned.

The operation of the filter element 1 of FIG. 6 is analogous to the embodiment described above.

In this case when necessary it will be possible to detach a filter bag 4 separately from the filter frame 3 and to replace or clean it and then fasten it to the filter frame 3 again.

It is clear that it is not excluded that in the first embodiment the filter bags 4 are detachable from the filter frames 3 and in other words that both the filter bag 4 and the entire filter 2 can be replaced.

It is also possible that in the first embodiment the filter frames 3 are not separately detachable and that only the filter bags 4 are detachable.

It is clear that 16 or 4 filters 2 do not necessarily have to be present in the filter element 1.

Calculations have shown that 9 or 20 filters 2, for example arranged in a 3×3 or 4×5 grid, guarantee an optimum airflow.

It is also not necessary that the filters 2 are arranged with their inlet piece 3 in a square grid or otherwise.

Although in all examples shown, the form of the filter bag is skittle-shaped, this is not necessarily so.

Figure 8:
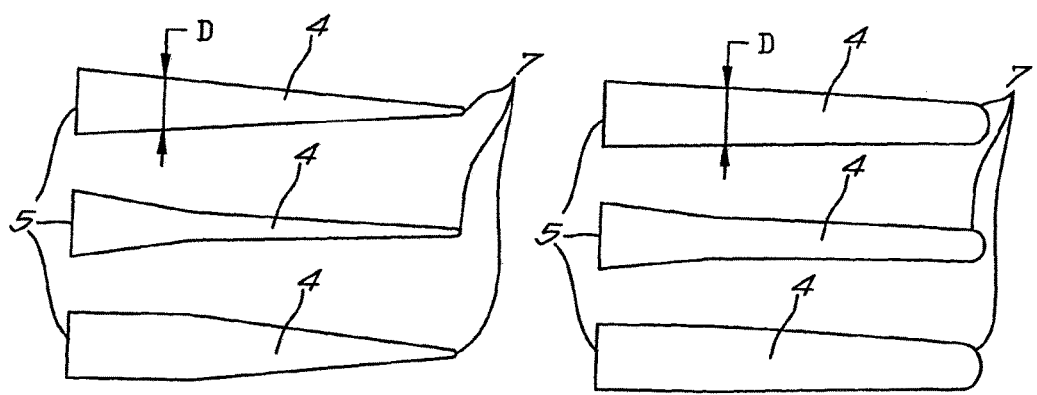
FIG. 8 schematically shows alternative forms of a filter bag for use in a filter element according to the invention.

FIG. 8 shows a number of possible alternative forms for a filter bag 4 for use in a filter device 1 according to the invention.

These filter bags 4 are all essentially cylindrical, whereby the diameter D of the filter bag 4 changes in the longitudinal direction of the filter bag 4.

More specifically the diameter D will gradually decrease from the inflow opening 5 to finally end in a rounded spherical end 7.

Depending on the extent of the decrease of the diameter, the end 7 has a larger or smaller radius.

Also in the examples of FIG. 8, the ratio of the maximum diameter D to the length of the filter bag 4 is equal to one to at least three.

The present invention is by no means limited to the embodiments described as an example and shown in the drawings, but a filter element according to the invention can be realised in all kinds of forms and dimensions, without departing from the scope of the invention.

The invention claimed is:

1. A filter element for filtering impurities from air, the filter element comprising one or more filters,
    wherein each of the one or more filters is composed of a filter frame that is connected to one or more filter bags, wherein the filter frame comprises one or more inflow openings through which air with said impurities to be filtered flows, and each of the one or more filter bags includes a first end which is open and fastened to the inflow opening and a second end which is closed;
    wherein each of the one or more filter bags respectively extends in length along a longitudinal direction of the respective filter bag and has a diameter that is substantially perpendicular to the longitudinal direction of the respective filter bag, wherein each of the one or more filter bags defines a continuous inner chamber that extends from the first end to the second end, and the diameter of each of the one or more filter bags changes along the longitudinal direction of the respective filter bag; and
    wherein filter bag includes a first part, a second part, and a third part,
    wherein
    the first part extends from the inflow opening to a first point at a first distance along the longitudinal direction of each of the one or more filter bags, wherein the diameter of the filter bag along the first part is constant or approximately constant,
    the second part extends from the first point along the longitudinal direction of each of the one or more filter bags to a second point at a second distance along the longitudinal direction of each of the one or more filter bags, wherein the diameter of the filter bag along the second part decreases, and
    the third part extends from the second point along the longitudinal direction to a third point at a third distance along the longitudinal direction of each of the one or more filter bags, wherein the diameter of the filter bag along the third part increases, and
    wherein the first part, the second part, and the third part are arranged along the continuous chamber between the first end and the second end.

2. A filter element according to claim 1, wherein the inflow opening of the filter frame has a circular, polygonal or oval cross-section, whereby the cross-sections of each of the filter bag parallel to the inflow opening are also circular, polygonal or oval.

3. A filter element according to claim 1, wherein the ratio of the maximum diameter to the length of each of the one or more filter bags is equal to one to at least three.

4. A filter element according to claim 1, wherein the first distance along the longitudinal direction of each of the one or more filter bags, in which the diameter of each of the one or more filter bags from the inflow opening to the first point at the first distance is constant or approximately constant is equal to approximately 25% of the total length of the filter bag, wherein the second distance along the longitudinal direction of each of the one or more filter bags, in which the diameter then decreases, is approximately 60% of the total length of the filter bag, after which the diameter then increases again and the second end has the spherical or practically spherical form.

5. A filter element according to claim 1, wherein the filter element comprises a plurality of filters that are connected together by the filter frame of each of the plurality of filters.

6. A filter element according to claim 1, wherein the filter element comprises a plurality of filters that are affixed in a casing by the filter frame of each of the plurality of filters.

7. A filter element according to claim 1, wherein the filter element comprises a plurality of filters that are connected together by the filter frame of each of the plurality of filters, or
    wherein the filter element comprises a plurality of filters that are affixed in a casing by the filter frame of each of the plurality of filters, the filter frames of each of the plurality of filters and the casing forming one unit.

8. A filter element according to claim 1, wherein the one or more filter bags and/or the filter frame for each filter can be detached and replaced separately.

9. A filter element according to claim 1, wherein the filter frame and the one or more filter bags of each of the one or more filters form an inextricable unit.

10. A filter element according to claim 1, wherein the one or more filter bags is made of paper, plastic, metal gauze, woven fabric, non-woven fabric, or a porous material.

11. A filter element according to claim 1, wherein the one or more filter bags is made of a material that is rigid.

12. A filter element according to claim 1, wherein each of the one or more filter bags is essentially cylindrical, each of the one or more filter bags having an essentially circular cross-section in a plane of the diameter.

13. A filter element according to claim 1, wherein the first distance along the longitudinal direction of each of the one or more filter bags, in which the diameter of each of the one or more filter bags from the inflow opening to the first point at the first distance is constant or approximately constant is equal to approximately 25% of the total length of the filter bag.

14. A filter element according to claim 1, wherein the second distance along the longitudinal direction of each of the one or more filter bags, in which the diameter then decreases, is approximately 60% of the total length of the filter bag.

15. A filter element according to claim 1, wherein the ratio of the smallest diameter of the filter bag to the diameter of the filter bag at the inflow opening is equal to about 0.57.

16. A filter element according to claim 1, wherein the ratio of the diameter of the second end to the diameter of the filter bag to the inflow opening is equal to about 0.71.

17. A filter element according to claim 1, wherein the second end is rounded in a cross-section perpendicular to the longitudinal direction and the second end has a spherical or practically spherical form.

* * * * *